United States Patent [19]

Sue

[11] Patent Number: 4,677,494
[45] Date of Patent: Jun. 30, 1987

[54] IMAGE READING APPARATUS

[75] Inventor: Takaji Sue, Atsugi, Japan

[73] Assignee: Kabushiki Kaisha Ricoh, Tokyo, Japan

[21] Appl. No.: 790,460

[22] Filed: Oct. 23, 1985

[30] Foreign Application Priority Data

Oct. 26, 1984 [JP] Japan .................................. 59-223859

[51] Int. Cl.$^4$ .............................................. H04N 1/12
[52] U.S. Cl. ..................................... 358/285; 358/293; 358/294
[58] Field of Search ........................ 358/293, 294, 285; 250/239

[56] References Cited

U.S. PATENT DOCUMENTS 4,542,414  9/1985  Nagane .............................. 358/285

*Primary Examiner*—Howard W. Britton
*Attorney, Agent, or Firm*—Oblon, Fisher, Spivak, McClelland & Maier

[57] ABSTRACT

In a image reading apparatus applicable to a facsimile machine, copying machine or the like which includes an original document transporting unit having therein an image reading point and a rigid base plate having thereon an optical element such as mirror or lens and a photoelectric conversion unit such as CCD to convert incident light information to an corresponding electrical signal, said transporting unit being supported to a rigid supporting member, said rigid plate being rotatably supported at its side end portion to an axis connected to said rigid supporting member, whereby a distance of an optical path from the reading point to the conversion unit is stably kept constant even though the housing of the apparatus is distorted.

5 Claims, 2 Drawing Figures

IMAGE READING APPARATUS

FIELD OF THE INVENTION

This invention relates to an image reading apparatus and more paticularly to an optical image reading apparatus applicable to a facsimile machine, copying machine or the like.

BACKGROUND OF THE INVENTION

Generally, an optical image reading apparatus has a function to read an image information of an origional by guiding the reflected light image of the original to a photoelectric conversion means such as light receiving element through an optical scanning device including a mirror unit and a lens unit. It is a fundermental condition for such an apparatus to maintain the distance of the reflected light path as constant as possible in order for the apparatus to work stably, said path starting from the image reading point where the light is reflected by the original and ending to the light receiving surface of the photo-electric sensor such as Charge Coupled Device where the senser receives the reflected light. Such conditions may be accomplished by an action of an adjusting device in a manufacturing step of the apparatus. However, when the distance of the light path changes accidentally, for example, due to distortion of the housing of the apparatus by placing it on an uneven place in use, re-adjusting of the error distance is extremely difficult. Accordingly, in order to prevent the occurrence of the error distance of the optical path in use, the prior art device selects the housing made of a rigid material or requires a strict condition as to the place installed. The former idea causes the apparatus cost-increasing and the latter has a limit to the completeness by itself.

OBJECT OF THE INVENTION

It is, therefore, an object of the present invention to provide an improved image reading apparatus which overcomes the disadvantages of prior art devices.

It is another object of the present invention to provide an image reading apparatus adapted to stably manifest a precise reading capability.

It is further object of the present invention to provide an image reading apparatus adapted to maintain highly accuracy with a low-price material.

SUMMARY OF THE INVENTION

In accordance with one aspect of the present invention, there is provided an image reading apparatus of the type wherein a light image of an original is projected to a photoelectric conversion means to produce an electric signal corresponding to said image, said apparatus comprising an original document transporting unit including an image reading point from which the light image proceeds to said photoelectric conversion means, a supporting member for supporting said transporting unit and a rigid base plate having fixedly thereon a light guiding unit and said conversion means, said base plate being rotatably supported at its end portion by said supporting member and being supported at its bottom portion by a part of housing of said apparatus.

DETAILED DESCRIPTION OF PREFERRED EMBODIMENTS

Figure 1:
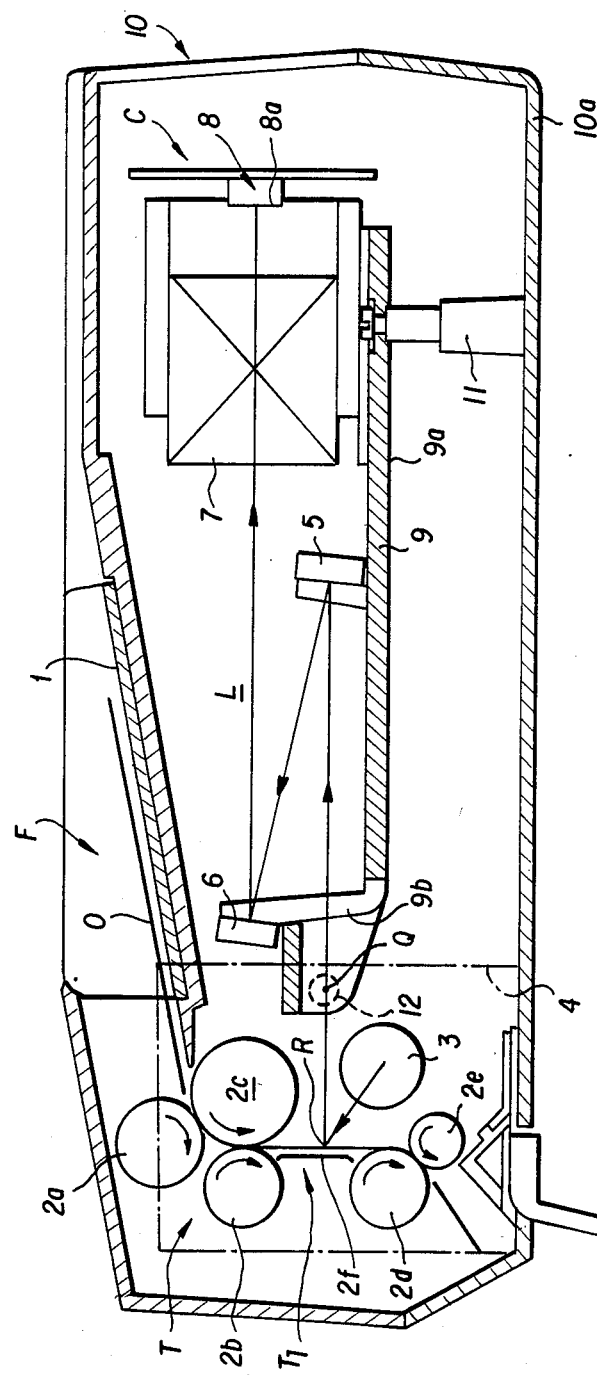
FIG. 1 is a cross sectional view in accordance with one typical embodiment of the present invention.

Referring now to FIG. 1 illustrating one example of an image reading apparatus embodying the present invention, there is provided an original document feeder unit F in an upper portion of the apparatus. The feeder unit F includes a slanting guide member 1 with a predetermined angle on which an original to be scanned is placed. To obliquely downward direction of the guide member 1 is provided an original document transporting unit T to transport the original O along the predetermined path. In this embodiment, a transporting path $T_1$ comprises transfer rollers $2a-2e$ along which the original is transferred at a predetermined speed.

There is operatively provided near the transporting path $T_1$ a lamp 3 which emits light toward the moving original for scanning. The light emitted from the lamp 3 proceeds to an image reading point R and then is reflected by the original in a predetermined direction. Each part of the transporting unit T and the lamp 3 is supported at a suitable position by a supporting member 4 made of such a material having fully rigid characteristics.

In the proceeding direction of the reflected light from the image reading point is provided a light guiding unit L including mirrors 5 and 6 and a lens 7, the function of which is to guide the reflected light to a photoelectric conversion means C. The conversion means comprises a CCD image sensor which converts the received reflected light into an electric signal in accordance with the quantity of incident light. Each of the guiding unit L and the conversion means C is stationarily fixed to a base plate 9 made of rigid material so that an unitary movement between them is achieved. Accordingly, the distance between the position of each optical part, such as mirrors 5, 6 and lens 7 and the image sensor 8 is kept constant, unless the base plate 9 itself is deformed.

Figure 2:
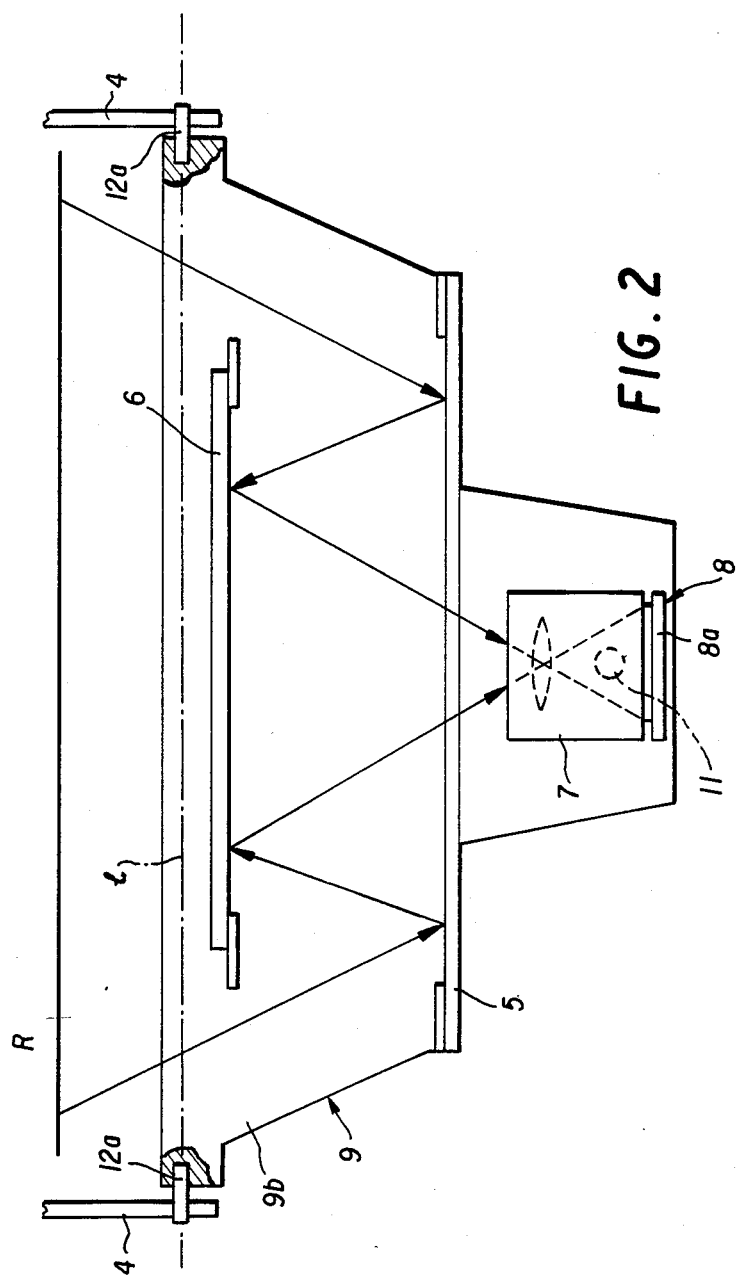
FIG. 2 is a plane view of optical scaning device in accordance with one typical embodiment of the present invention.

The base plate 9 is supported at its bottom portion to a boss 11 projecting from the base portion 10a of a housing 10 including all of the transporting unit T, the guiding unit L and the conversion means C and is further rotatably supported at its end portion 9b on the incident side of the light to a supporting axis 12 supported on the supporting member 4. The axis 12 is mounted in parallel relationship to the surface of the original at the image reading point R. It is preferable that the broad area of the supporting member 4 contacts with the axis 12a. The supporting axis 12 is provided within the member 4 but far from the image reading point R where the lamp 3, the transfer rollers $2a-2e$ and a transfer guide $2f$ are concentrately disposed. Therefore, the installation or adjustment of the supporting axis 12 is easily done and further the material of the base plate 9 is selected from those having fully rigid characteristics. In this embodiment, as shown in FIG. 2, a pair of the supporting axis 12 supported to opposite ends of the supporting member 4 supports opposite side ends of the end portion 9b and the reflected light passes through a hypothetical center line 1 between longitudinal central portions of the axis 12 (see FIG. 1).

Even though the base 10a is bent because of installation of this apparatus at an uneven place, the base plate 9 and the parts fixedly connected thereto such as the guiding unit L and the conversion means C rotate all together around the axis 12 in accordance with the distortion quantity of the base 10a. Accordingly, the distance of the optical path from a point Q which is on the center line 1 to the image sensor 8 via the mirrors 5, 6 and the lens 7 is kept constant. When a part of the optical path distance from the image reading point R to the point Q is 30 mm in the image reading apparatus for a document of B-4 size (257 mm×364 mm), the rest of distance from the point Q to the image sensor is 146 mm. In this example, even though the position of the image sensor moves upwardly or downwardly by 3 mm, the position of the image reading point moves at most by ±0.6 mm as can be calculated from the proportional equation as to R, Q and the image sensor 8. The movement of the point R with such a small distance does not exert fatal influence upon the capability of reading or scanning the image and then it is a negligible order. Further, a change in the distance of the whole optical path from the point R to the image sensor is ±0.006 mm under the calculation and it is also a negligible order.

In order to maintain a good reading capability for a long time, it is required to keep the parallel relationship between the surface 8a of the image sensor 8 and the image reading point R as far as the main-scanning direction of the original is concerned, in addition to maintaining the optical path distance constant. In this embodiment, the base plate 9 made of a rigid material is supported by the axis 12 which is arranged to bein broad-area contact with the supporting member 4 also made of a rigid material. The parallel relationship between the main-scanning direction and the surface 8a is determined by the position of the guiding unit L and the conversion means C so that the deterioration of the parallel relationship produced by supporting the base plate 9 on the axis 12 does not practically occur. It is noted that even if the supporting member 4 is made of a rigid material, its area is so small that the ratio of the cost to the whole apparatus is also small. Furthermore, since the base plate 9 is fixedly supported at its central part in the bottom portion 9b by the boss 11, the deforming of the base portion 10a has no substantial effect on the base plate 9. Accordingly, the parallel relationship between the image sensor 8 and the main-scaning direction is stably kept and the deterioration of the image quality is substantially eliminated.

As can be understood from the afore-mentioned explanation, according to the present embodiment, a supporting member of an original document transporting unit is rotatably connected to a base plate including a scanning unit from which an output signal is produced in accordance with quantity of incident light to an image sensor thereby absorbing distortion of the housing of an apparatus. Therefore, in spite of the deformation of the housing, the distance of the optical path from the image reading point to the light receiving surface of the image sensor is kept substantially constant. An image reading apparatus of the present invention may be manufactured at a small size, light weight or low cost because it does not require the housing having rigid characteristics.

While the above provides a full and complete disclosure of the preferred embodiments of the present invention, various modifications, alternate constructions and equivalents may be employed without departing from the true spirit and scope of the invention. For example, the combination of mirrors and lens in a scanning unit is not limited to the described embodiment. Thus, the above description and illustration should not be construed as limited the scope of the invention, which is defined by the appended claims.

What is claimed is:

1. In an image reading apparatus of the type wherein a light image of an original is projected to a photoelectric conversion means to produce an electric signal corresponding to said image, said apparatus comprising;
   an original document transporting unit including an image reading point from which the light image proceeds to said photoelectric conversion means,
   a supporting member for supporting said transporting unit, and
   a rigid base plate having fixedly thereon a light guiding unit and said conversion means,
   said base plate being rotatably supported at its end portion by said supporting member and being supported at its bottom portion by a part of the housing of said apparatus for maintaining an optical alignment said light guiding unit, said conversion means with said image reading point.

2. In an image reading apparatus according to claim 1, said supporting member includes an axis mounted in parallel relationship to a direction of main scanning at said image reading point, said axis supporting said end portion of the plate.

3. In an image reading apparatus according to claim 2, said axis is mounted to the portion of said supporting member far from said image reading point.

4. In an image reading apparatus according to claim 1, said light guiding unit includes mirror and lens unit.

5. In an image reading apparatus according to claim 1, said bottom portion is fixedly supported by said part of the housing, said part comprising a boss projecting from said housing.

* * * * *